Patented Aug. 28, 1945

2,383,617

UNITED STATES PATENT OFFICE 2,383,617

CHEMICAL PROCESS

John W. Robinson, Cleveland Heights, Ohio, assignor to E. I. du Pont de Nemours & Company, Wilmington, Del., a corporation of Delaware No Drawing. Application January 13, 1944, Serial No. 518,097

3 Claims. (Cl. 260—500)

This invention relates to processes for producing sodium cyclohexylsulfamate and more particularly to such processes in which cyclohexyl ammonium N-cyclohexylsulfamate is dispersed in an aqueous solution containing at least 20% by weight of dissolved sodium hydroxide, the dispersion is agitated and heated, whereby sodium cyclohexylsulfamate is precipitated, and the sodium cyclohexylsulfamate is removed, preferably after cooling the dispersion.

In United States Patent 2,275,125, issued March 3, 1942, to Audrieth and Sveda, there is described a method for producing sodium cyclohexylsulfamate in which cyclohexylamine is sulfonated with chlorosulfonic acid to give a precipitate of the cyclohexylammonium N-cyclohexylsulfamate, the precipitate is filtered off and dissolved in dilute sodium hydroxide solution, and the solution is evaporated to dryness, the sodium cyclohexylsulfamate being recovered from the dry residue by recrystallization. While this method gives a produce of excellent quality, the manipulative steps, such as evaporating to dryness, are time-consuming and expensive and the yield of product is not as high as might be wished.

Now I have found that, in contrast to the method of the Audrieth and Sveda patent, a remarkably higher yield and a substantial simplification of the method for producing sodium cyclohexylsulfamate can be achieved by processes comprising dispersing cyclohexylammonium N-cyclohexylsulfamate in an aqueous solution containing at least 20% by weight of dissolved sodium hydroxide, agitating and heating the dispersion, whereby sodium cyclohexylsulfamate is precipitated, and removing the sodium cyclohexylsulfamate, preferably after cooling the dispersion.

By dispersing the cyclohexylammonium N-cyclohexylsulfamate in a sodium hydroxide solution having an initial concentration higher than is taugh in the Audrieth and Sveda patent and by heating the solution without evaporating it to dryness, I avoid the formation of a certain water-insoluble residue which, according to the previous practice, was formed at the expense of the desired product and from which the desired product could be separated only by recrystallization. Moreover, cyclohexylamine, which is produced by the reaction of sodium hydroxide and cyclohexyl-ammonium salt, is easily recovered, in a process of my invention, as a separate liquid phase, either before or after removal of the sodium cyclohexylsulfamate, and may be sulfonated to form additional cyclohexylammonium N-cyclohexylsulf-amate for use in the process. According to my invention, these advantages are combined with improvement in yield and simplification of operation to give processes of maximum economy.

The cyclohexylammonium N-cyclohexylsulfamate used in my novel processes may advantageously be obtained by sulfonating cyclohexylamine, as described, for instance, in Example II of the Audrieth and Sveda patent, or it may be prepared by any other suitable method.

The solution used for dispersing the cyclohexylammonium N-cyclohexylsulfamate should contain at least 20% by weight of sodium hydroxide. Excellent results are obtained using a 30% solution. The amount of sodium hydroxide solution should be such that the cyclohexylammonium N-cyclohexylsulfamate and the sodium hydroxide are present in about equimolar proportions. The proportions by weight are derived according to the equation:

(1)

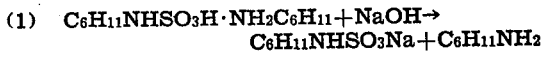

If the cyclohexylammonium N-cyclohexylsulfamate is obtained by sulfonating cyclohexylamine with chlorosulfonic acid, there may also be present an equivalent amount of cyclohexylammonium hydrochloride which reacts according to the equation:

(2)

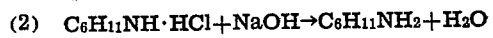

The total amount of sodium hydroxide should, of course, be sufficient to meet the requirements of both Reactions 1 and 2, and a small excess may be maintained if desired, but ordinarily, I prefer to use about the stoichiometric proportions indicated by the above equations.

Taking into account that both the product and the cyclohexylammonium N-cyclohexylsulfamate from which it is made may be simultaneously present in the sodium hydroxide solution, the nature of the agitation which must be provided to effect dispersion of the reactants and to promote the reaction will be readily apparent to one skilled in the art. Agitation which subjects the insolubles to attrition, such as is obtained in a ball-mill, paint mill, or graining kettle, is well suited to the purpose, but an ordinary paddle agitator may be used, provided vigorous agitation is maintained.

The dispersion of cyclohexylammonium N-cyclohexylsulfamate in sodium hydroxide solution should be heated for a time sufficient to permit the reaction between the sulfamate and hydroxide to go to completion at the particular temperature used. Ordinarily, a heating period of one to four hours will be adequate in the temperature range of about 60 to 100° C. It is preferable that the temperature not exceed about 100° C. I have found that excellent results are obtained by heating at about 90° C. for about one hour.

The precipitate of sodium cyclohexylsulfamate produced as above described is removed from the aqueous reaction medium by such methods as filtration or settling and decanting. Preferably, the dispersion should be cooled before removing the product, and desirably, the degree of cooling should be the maximum practicable. It is preferred to cool to a temperature of about 5° C., although cooling only to room temperature (about 25 to 30° C.) will give good results.

My invention will be better understood by reference to the following illustrative example.

*Example*

A mixture of cyclohexylammonium N-cyclohexylsulfamate and cyclohexylamine hydrochloride was made as follows: To 520 parts by weight of cyclohexylamine, having a boiling point of 133–134° C., dissolved in 3100 parts of carbon tetrachloride, there was added cautiously with stirring 194 parts of chlorosulfonic acid dissolved in 200 parts of carbon tetrachloride. A precipitate comprising the sulfamate and hydrochloride was thus formed.

The precipitate obtained by sulfonation of cyclohexylamine, as above described, was dispersed with violent agitation in a solution of 218 parts of sodium hydroxide dissolved in 518 parts of water. The mixture was held at 90–100° C. during the addition of the salt and for one hour afterwards, agitation being continued during this time. The mixture was then cooled to 5° C. and the precipitate of sodium cyclohexylsulfamate which had been formed by the reaction was removed by filtration.

The product was recrystallized by dissolving it in the minimum amount of water and boiling it for one hour with activated charcoal. The yield of recrystallized product, based on cyclohexylamine, was 70%.

While in the foregoing description of my invention, I have shown certain specific embodiments, it will be understood that without departing from the spirit of my invention, one skilled in the art may readily employ numerous processes for producing sodium cyclohexylsulfamate.

I claim:

1. In a process for producing sodium cyclohexylsulfamate, the steps comprising dispersing cyclohexylammonium N-cyclohexylsulfamate in an aqueous solution containing at least 20% by weight of dissolved sodium hydroxide, agitating and heating the dispersion, whereby sodium cyclohexylsulfamate is precipitated, and removing the sodium cyclohexylsulfamate from the dispersion.

2. In a process for producing sodium cyclohexylsulfamate, the steps comprising dispersing cyclohexylammonium N-cyclohexylsulfamate in an aqueous solution containing at least 20% by weight of dissolved sodium hydroxide, agitating and heating the dispersion, whereby sodium cyclohexylsulfamate is precipitated, and removing the sodium cyclohexylsulfamate after cooling the dispersion.

3. In a process for producing sodium cyclohexylsulfamate, the steps comprising dispersing cyclohexylammonium N-cyclohexylsulfamate in an aqueous solution containing about 30% by weight of sodium hydroxide, the cyclohexylammonium sulfamate and sodium hydroxide being in equimolar proportions, agitating and heating the dispersion at about 90° C. for about one hour, whereby sodium cyclohexylsulfamate is precipitated, cooling the dispersion to about 5° C., and removing the sodium cyclohexylsulfamate by filtration.

JOHN W. ROBINSON.